United States Patent [19]

Derner

[11] Patent Number: 4,768,319

[45] Date of Patent: Sep. 6, 1988

[54] DEVICE FOR SECURING AN AUTOMOTIVE GLASS PANE IN AN AUTOMOBILE BODY

[75] Inventor: Peter Derner, Gelsenkirchen, Fed. Rep. of Germany

[73] Assignee: Flachglass Aktiengesellschaft, Furth, Fed. Rep. of Germany

[21] Appl. No.: 119,194

[22] Filed: Nov. 10, 1987

[30] Foreign Application Priority Data

Nov. 22, 1986 [DE] Fed. Rep. of Germany ....... 3639936

[51] Int. Cl.⁴ .............................................. E06B 3/62
[52] U.S. Cl. ...................... 52/208; 52/397; 52/403; 49/466
[58] Field of Search .......... 52/204, 207, 208, 397–403, 52/716; 49/463, 466

[56] References Cited

U.S. PATENT DOCUMENTS

| | | | |
|---|---|---|---|
| 3,150,421 | 9/1964 | Lickert | 52/208 |
| 4,347,693 | 9/1982 | Kruschwitz | 52/208 |

FOREIGN PATENT DOCUMENTS

| | | | |
|---|---|---|---|
| 2015496 | 10/1971 | Fed. Rep. of Germany | 52/400 |
| 2464359 | 6/1981 | France | 52/397 |

*Primary Examiner*—James L. Ridgill, Jr.
*Attorney, Agent, or Firm*—Herbert Dubno

[57] ABSTRACT

A device for securing an automotive glass pane in an automotive body makes use a molded frame secured to the periphery of the glass pane and provided with a rearwardly projecting U-shaped recess internally formed with saw-teeth which can engage saw-teeth on a ledge or projection of a strip for a U-shaped receptacle body flange of the vehicle extending parallel to the pane. The sealing strip is affixed at least to a web of the frame and bears upon the body.

10 Claims, 1 Drawing Sheet

DEVICE FOR SECURING AN AUTOMOTIVE GLASS PANE IN AN AUTOMOBILE BODY

FIELD OF THE INVENTION

My present invention relates to a device for securing an automotive glass pane in an automobile body so as to form a window therein and, more particularly, to the attachment of the pane of a automotive window to the bodywork of the motor vehicle.

BACKGROUND OF THE INVENTION

It is known to provide a glass pane for use in an automotive body, with a frame which engages the sheet edge or periphery of the pane and which can be affixed by a detent arrangement to a complementary detent arrangement on a flange of the bodywork of the motor vehicle.

In such systems, the body of the automotive vehicle can be considered to have a casing structure which can be formed with a flange extending generally parallel to a face of the glass pane. A nonrigid elastic seal can be provided between the frame which is affixed to the pane and the body of the vehicle.

The frame can completely surround the pane or extend only over part of the periphery thereof, may be made in one piece or in several pieces, and can be attached firmly to the pane in any desired manner. Indeed, the frame can be permanently or nondetachably affixed to the pane at the time of manufacture of the latter.

A vehicle window system of this type is described in German patent application DE-OS No. 33 33 672 and in this construction, the clips carried by the frame must be fitted into holes provided on the flange of the casing.

Assembly, utilizing expanding pins, is a complex operation and in many cases, the fit tolerances can not be taken up effectively so that there are difficulties in the security of the mounting, with respect to the vibration and with respect to accuracy of assembly. In many cases, therefore, the process is made even more time consuming because the parts do not fit together effectively.

Furthermore, in prior art systems an additional sealing maybe required by the frame and body utilizing a special sealing component to bridge any gap between the frame and the body or casing. As a result, conventional systems have been generally unsuited for automatic mass production because of the large number of components involved and the assembly techniques which are required.

OBJECTS OF THE INVENTION

It is the principal object of the present invention to provide an improved window assembly for automotive vehicles whereby these drawbacks are avoided.

Another object of the invention is to provide an improved device for securing an automotive glass pane in an automobile body which can utilize simple components, wherein the problems of accurate fit are eliminated, where tolerances in assembly can be eliminated and, in general, which can be assembled more simply and with a degree of accuracy.

SUMMARY OF THE INVENTION

These objects and others which will become apparent herein after are attained, in accordance with the present invention in a device for securing an automotive glass pane in an automobile body having a casing or sash flange lying parallel to and binding the pane. The device comprises a frame attached to the perimeter of the glass pane and having a portion receiving and affixed to the perimeter of the pane, an inwardly extending web affixed to this portion and lying along a face of the pane generally parallel to the flange and a first detent formation molded on the web and turned toward the flange.

An angle strip is fixed to the flange and includes a U-shaped receptacle or socket receiving in addition of the flange, a lateral projection from the receptacle, and a second detent formation molded on the lateral projection, complementary to and engagable with the first detent formation in a tolerance-eliminating interfit to lock the pane to the body.

The third component of the device is a soft elastic member extending around the frame and secured on the web while being deflectable by and engagable with the body and the flange upon interfitting of the formations.

Advantageously, the frame has a generally Z-shaped cross section forming the portion which is affixed to the peripheral edge of the pane, a second arm extending away from the first arm and further with the first detent formation, and the web which connects the two arms. The first arm can form a channel receiving the periphery of the pane while the second arm can be formed with a U-shaped recess uponing in the direction of the lateral projection of the strip and receiving the second formation by engaging it with the first formation which is formed in the U-shaped recess.

The formations can each be a set of sawtooth elements and the sealing member can be nondetachable joined to the frame and formed with an outwardly extending lip engagable with a surface of the body and bridging a gap between the seal and the body.

The frame and the strip can both be molded from hard but elastic synthetic resin while the sealing member is molded from a soft elastic synthetic resin.

Either or both of the frame and the strip may contain reinforcing inserts molded into the material thereof. Before the pane is affixed to the body, the strip can be movable along the flange and can then be held in place by the compression of the sealing member once the interfit is accomplished.

Since the two molded formations are complementary and can be inserted one into the other so that a fit is achieved in which tolerances are completely eliminated or offset, i.e. so that there is absolutely no play, the assembly can be made with ease and with accuracy, without the drawbacks enumerated above.

The best closure elements or formations are provided on profile members, i.e. angled structures, in the molding process so that special attachment processes as, for example, the welding of clips can be eliminated.

The profiles used can be injection molded members and, for example, the frame or parts thereof can be injection molded directly onto the glass pane.

If appropriate, complementary mold closure eliminates are provided, manufacturing of the components is simplified considerably. This allows a very high degree of accuracy to obtain for the components and the molded-on shaped closure elements.

The tolerances resulting from the fact that the glass pane, the bodywork of the vehicle and the molded parts can be offset because the complementary shaped closure elements can be joined to balance out tolerances.

Tolerance elimination can be achieved in various ways. One possibility is that the components referred to can be made sufficiently deformable. Another possibility is that several shaped closure stages, e.g. several click stop stages are provided.

A second degree of freedom for the balancing-out of tolerances is obtained by the fact that the corner strip with its U-shaped recess can be pushed on to the sash side to a varying degree. Consequently, the problems of fit described are for the most part eliminated in accordance with the invention.

It is obvious that the components of the arrangement in accordance with the invention are designed in such a way that all stressed occurring when driving the motor vehicle are absorbed and during assembly the snap-on connection can be produced so that it operates safely by means of snap-fitting the parts into one another.

None the less, with the arrangement in accordance with the invention the automotive glass pane with the frame placed on can easily be removed if such a removal is necessary. For the purposes of removal it is sufficient to bend the shaped closure elements and the complementary shaped closure elements away from each other, which can take place under compression of the sealing profile and is therefore possible, because the snap-on connections are always sufficiently elastically deformable.

In connection with this, a sheet metal strip or similar component can be inserted into the snap-on connection opened in the direction of the frame with the aid of a suitable tool, with the strip keeping the shaped closure elements and the complementary shaped closure elements in the open state. Generally, the frame has an essentially Z-shaped profile in cross section, is joined to the automotive glass pane by the stem of the Z and one arm of the Z, and has its other arm of the Z provided with the shaped closure elements.

A profile with this cross-section can be produced very easily and very accurately by means of extrusion. The arm of the Z joined with the automotive glass pane can in connection with this have a U-shaped recess, which is placed on the edge of the sheet and thus at the same time ensures precise assembly of the frame components.

Advantageously, the arm of the Z carrying the shaped closure elements has a U-shaped recess, which on the inside is provided with the shaped closure elements.

In this case, the corner strip will also be fitted with shaped closure elements, which fit into the U-shaped recess. The shaped closure elements and the complementary shaped closure elements are preferably designed as saw-tooth elements. The sealing profile will be joined undetachably to the frame for reasons connected with assembly techniques. This can in principle take place by means of co-extrusion. This can however also be achieved by means of gluing-on.

In any event, the frame should be fitted with the sealing profile when fitting the automotive glass pane. It is evident that the sealing profile is only linked to the profiled stem of the frame where there is a frame. If the frame consists only of frame sections, between which intervals are arranged, the sealing profile is secured in this area to the automotive glass pane itself. As the sealing profile is linked to the profile stem of the frame towards the outer edge of the automotive glass pane, the sealing profile can if need be have a molded on side, with which any gap between the edge of the automotive glass pane with the placed-on frame and the bodywork of the motor vehicle can be bridged.

It is evident that rough edges and moldings can be provided on the bodywork side or on the corner strip in order to prevent any slippage. The nonrigid frame component can, according to the circumstances, be firmly joined to the rigid component or the glass pane. In any event, sealing on all sides must be ensured. It lies within the framework of the invention to make the design such that the corner strip can be moved on the sash side, however once the frame has been locked on can be fixed by means of the pressing force of the nonrigid elastic sealing profile.

The components of the device in accordance with the invention can be produced from a large number of materials. In particular, it is possible to mold the frame and the corner strip from hard elastic plastic (e.g. ABS), if necessary with reinforcing inserts. The sealing profile can be designed as a nonrigid elastic plastic component (e.g. a silicone rubber). The nonrigid frame components can also be made nonrigid by means of hollow cavities. Of particular advantage is the fact that the components in the arrangement in accordance with the invention can be easily produced, i.e. within the framework of mass production. In particular, using a two-stage injection molding process, both the frame can be injection molded on to the motor vehicle glass pane and the sealing profile can be produced and joined to the frame. In connection with this, various materials can be used. Prefabricated components of the arrangement in accordance with the invention can be held in the injection molding mold, for example, the shaped closure elements. It is evident that the components in the unit in accordance with the invention can also be produced using extrusion and can be molded on to the automotive glass pane.

BRIEF DESCRIPTION OF THE DRAWING

The above objects, features and advantages of our invention will become more readily apparent from the following description, reference being made to the accompanying highly diagrammatic drawing in which.

SPECIFIC DESCRIPTION

Figures 1, 2:
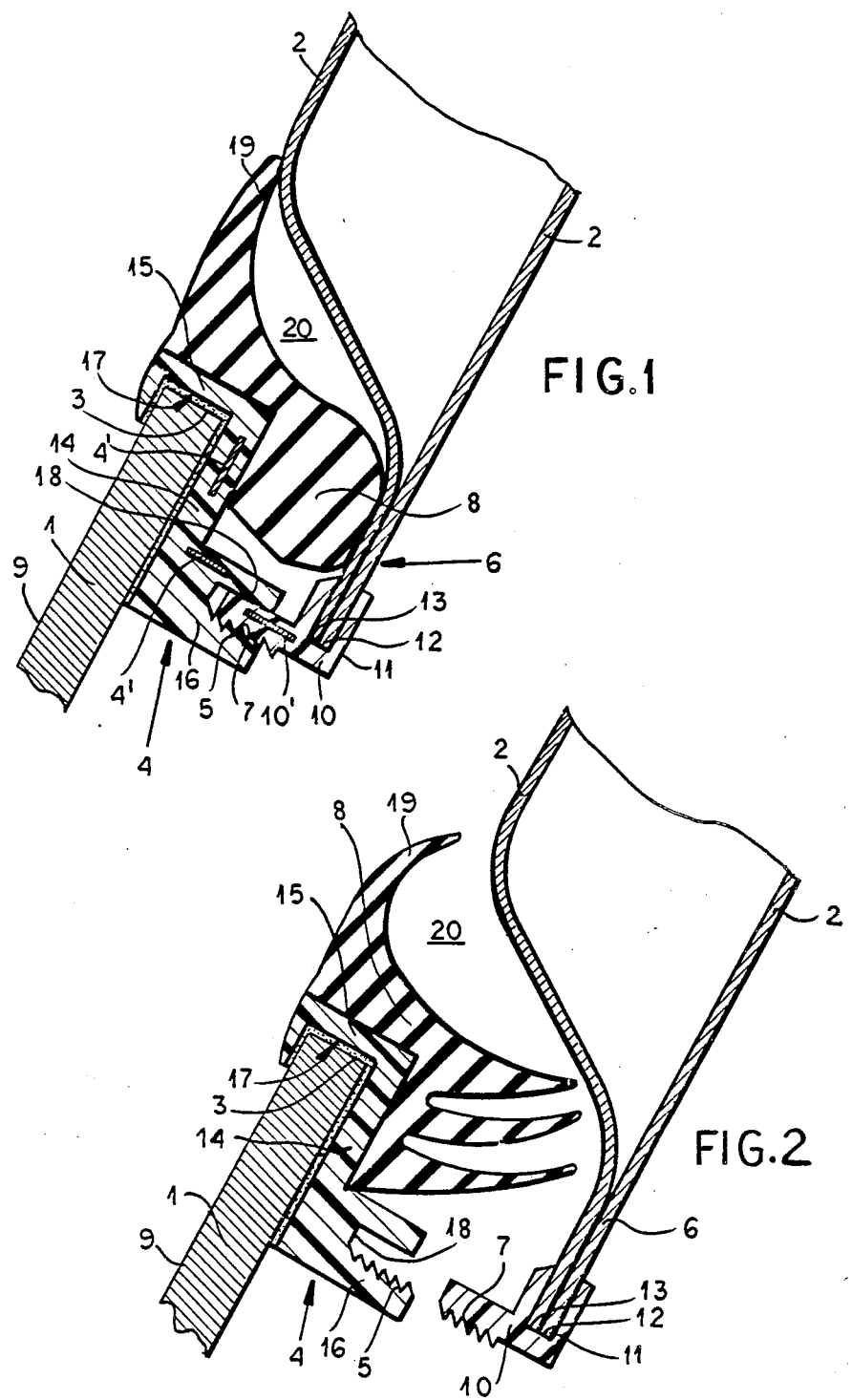
FIG. 1 is a cross section through the body of a motor vehicle having a sash flange and a fitted motor vehicle window with the arrangement in accordance with the invention.
FIG. 2 is a similar view of a further embodiment of FIG. 1.

The arrangement shown in the drawing is used for securing an automotive glass pane 1 in the sash of the bodywork of a motor vehicle 1.

In FIGS. 1 and 2, a frame 4 is fixed on the sheet edge 3 of the automotive glass pane 1 and has shaped closure elements or detent formations 5. A sash flange 6 runs parallel to a greater or lesser extent to the automotive glass pane 1 and carries complementary shaped closure elements or detent formations 7. A nonrigid elastic sealing profile 8 is positioned between the automotive glass pane 1 and the sash side 6.

The frame 4 can be in a single piece or several pieces, whereby in the case of a multi-part structure there may be intervals between the individual frame components. The frame sections have shaped closure elements 5, which have been molded on.

The complementary shaped closure elements 7 are molded on a corner strip 10, the other corner side 11 of which with a U-shaped recess 12 is placed on the edge 13 of the sash side 6.

Towards the outer edge of the automotive glass pane 1, the sealing profile 8 is joined to the profiled web 14 of the frame 4, where there is a frame section, and otherwise placed on the automotive glass pane 1.

The frame 4 has in cross section an essentially Z-shaped profile, which with the web of the Z 14 and one arm of the Z 15 is joined to the automotive glass pane 1.

The other arm of the Z 16 carries the shaped closure elements 5.

The arm of the Z 15 joined to the automotive glass pane 1 has a U-shaped recess 17, which is placed on the edge of the sheet 3 and could have a funnelshaped opening, in order to make it easier to push in the relevant component of the corner strip.

The arm of the Z 16 carrying the shaped closure elements 5 in the example of embodiment also has a U-shaped recess and the arrangements is such that this U-shaped recess 18 carries the shaped closure elements or detent formations 5 on the inside.

The corner strip 10 has the complementary shaped closure elements or detent formations 7, which fit into the U-shaped recess 18.

FIG. 1 shows the locked-in state, FIG. 2 shows the conditions directly before pushing together the shaped closure elements 5 and the complementary shaped closure elements 7. The shaped closure elements 5 and the complementary shaped closure elements 7 are designed as saw tooth elements.

The sealing profile 8 is undetachably joined to the frame 4. It has a molded-on side 16, with which a gap 20 between the edge of the sheet 3 with the fitted frame 4 and the bodywork of the motor vehicle 2 is or can be bridged.

The frame 4 and the corner strip 10 consist for example of hard elastic plastic, if necessary with reinforcing inserts 4' and 10'. The sealing profile 8 can be cast from nonrigid elastic plastic.

It lies within the framework of the invention, after inserting the automotive glass pane 1 and after producing the snap-on connection to insert safety bolts into the relevant components to prevent the snap-on connection from coming loose. For this purpose, appropriate bore holes are provided or the safety bolts can be driven-in. The recess 12 in the corner strip 10 can initially be movable on the sash side, i.e. for the purposes of balancing-out tolerances. After the frame 4 has been locked on, one side of the recess 12 can however be pressed so firmly against the sash side 6 by the nonrigid elastic profile 8 that the glass pane 1 is joined to the bodywork 2 such that it is immovable.

We claim:

1. A device securing an automotive glass pane in an automobile body having a sash flange lying behind and generally parallel to said pane, said device comprising:
    a frame secured to the perimeter of said glass pane and comprising:
        a portion receiving the perimeter of said pane,
        an inwardly extending web affixed to said portion and lying along a face of said pane generally parallel to said flange, and
        a first detent formation molded on said web turned toward said flange;
    an angle strip fixed to said flange and including:
        a U-shaped receptacle receiving an edge of said flange,
        a lateral projection from said receptacle, and
        a second detent formation molded on said lateral projection complementary to and engaged with said first detent formation in a tolerance-eliminating interfit to lock said pane to said body; and
    a soft elastic sealing member extending around said frame and secured on said web while being deflectible by and engageable with said body and said flange upon interfitting of said formations.

2. The device defined in claim 1 wherein said sealing member is nondetachably joined to said frame.

3. The device defined in claim 1 wherein said sealing member is formed with an outwardly extending lip engageable with a surface of said body and bridging a gap between said seal and said body.

4. The device defined in claim 1 wherein before said pane is affixed to said body, said strip is movable on said flange, but is fixed thereon by a pressing force generated by compression of said member upon interfitting of said formations.

5. The device defined in claim 1 wherein said frame and said strip are molded from hard but elastic synthetic resin and said member is molded from a soft elastic synthetic resin.

6. The device defined in claim 5 wherein said frame and said strip contain reinforcing inserts.

7. The device defined in claim 1 wherein said frame has a generally Z-shaped cross section having a first arm forming said portion, a second arm extending away from said first arm and formed with said first detent formation, and said web bridging said arms.

8. The device defined in claim 7 wherein said portion formed by said first arm is a channel receiving the periphery of said pane.

9. The device defined in claim 7 wherein said second arm is formed with a U-shaped recess opening in the direction of said lateral projection and receiving said second formation, said first formation being formed within said U-shaped recess.

10. The device defined in claim 7 wherein said formations are each a set of sawtooth elements.

* * * * *